F. F. HEFFERNAN.
COMBINED ANTISKIDDING AND JACK ATTACHMENT FOR AUTOMOBILES.
APPLICATION FILED MAY 20, 1911.
1,019,469. Patented Mar. 5, 1912.
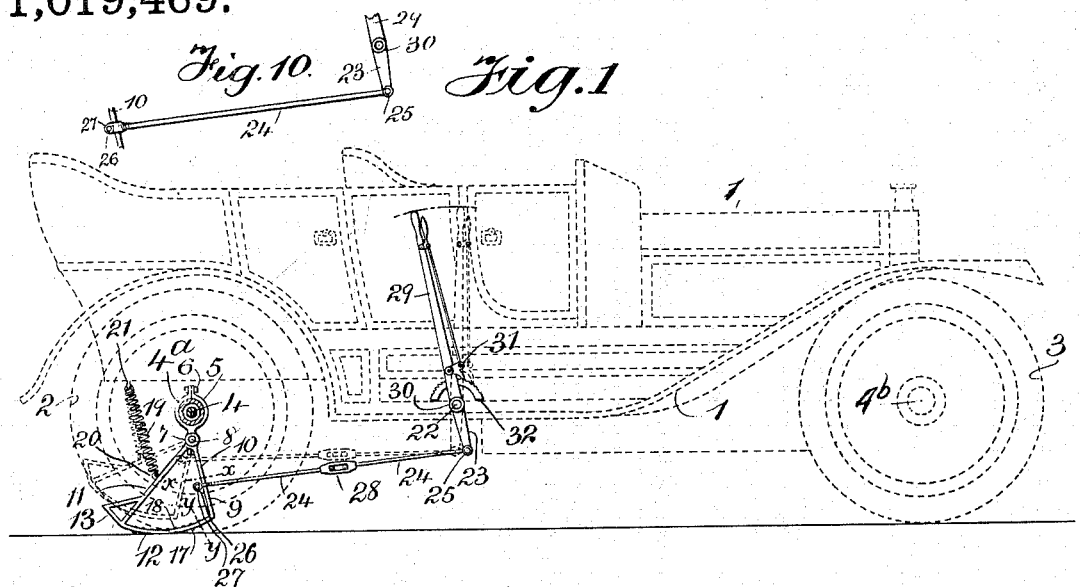

UNITED STATES PATENT OFFICE.

FLORENCE FRANK HEFFERNAN, OF NEW YORK, N. Y.

COMBINED ANTISKIDDING AND JACK ATTACHMENT FOR AUTOMOBILES.

1,019,469.  Specification of Letters Patent.  Patented Mar. 5, 1912.

Application filed May 20, 1911. Serial No. 628,378.

*To all whom it may concern:*

Be it known that I, FLORENCE F. HEFFERNAN, a citizen of the United States, residing at the borough of Brooklyn, county of Kings, city and State of New York, have invented an Improvement in a Combined Antiskidding and Jack Attachment for Automobiles, of which the following is a specification.

My invention relates to an attachment for automobiles and other motor road vehicles with the object of preventing accidents which frequently occur due to skidding, especially on wet, very dry, or greasy roads, and a further object of my invention is to so construct the brake or anti-skidding device that it may when desired be employed as a jack for lifting the vehicle from the ground.

The details of the invention are hereinafter fully set forth and explained.

In the accompanying drawing: Figure 1 is a side elevation of an automobile in dotted lines with my improvement attached, and showing it in full lines in an operative position, and in dotted lines in its normal position. Fig. 2 is a rear view of the rear axle sleeve and wheels of an automobile showing my invention attached. Fig. 3 is a diagrammatic view and partial section showing the jack in use. Fig. 4 is a perspective view of one of the hangers detached. Fig. 5 is an inverted plan of one of the hangers detached. Fig. 6 is a perspective view of one of the two-part clamp members detached. Fig. 7 is a sectional view at the dotted line $x$, $x$, of Fig. 1 in larger size. Fig. 8 is a sectional view of one shoe at the dotted line $y$, $y$, of Fig. 1 in larger size. Fig. 9 is a broken and partial transverse section showing in larger size the manner of connecting the transverse shaft to the frame, and the hand lever and connecting rods to the shaft, and Fig. 10 illustrates one of the connecting rods when the turnbuckles are dispensed with.

Similar reference numerals refer to like parts throughout the several views.

1 indicates the body of an automobile which may be of any style or make; 2 indicates the rear wheels of the vehicle and 3 the front wheels thereof. These parts are shown in Figs. 1 and 3, in dotted lines.

4 indicates the rear axle and 4ᵇ the front axle of an automobile.

The vehicle may be propelled by any suitable mechanism or means.

I have shown and will describe my invention as applied to a vehicle where the rear axle propels the rear wheels and the axle is surrounded by a sleeve or tubing 4ᵃ and my attachment clamped thereto; but if the rear axle is stationary and the wheels are driven by other means, my attachment is secured directly to the axle.

5 indicates four two part clamp members, each pair of which are adapted to be clamped together over the axle sleeve 4ᵃ and secured by the bolts 6. Two pairs of these clamp members are thus secured to the rear axle sleeve spaced apart and adjacent each end of the axle. These clamp members extend below the axle and sleeve and in this part are each provided with a socket 7 to receive and hold the bolts or pins 8. These bolts or pins 8 provide a pivotal support and bearing for the hangers 9 which comprise the straight bars 10 and 11 terminating in the curved shoes 12, and provided at the rear of the lower end of each of the bars 11 with a triangular projection forming the jacks 13. The bolts or pins 8 pass through the sockets 14 at the top of the hangers 9 and said hangers are arranged centrally on said bolts or pins. Surrounding said bolts or pins at either side of said hangers and bearing between them and the clamp members 5 are helical springs 15.

The shoes 12 are each provided with a plurality of holes 16 for the reception of bolts 17 headed on one end and screw-threaded on the other for the reception of nuts 18. These bolts are inserted from the bottom of the shoes, and the nuts are screwed to the ends of the bolts projecting on the upper surfaces of the shoes.

19 19 indicate two spiral springs, one end of each of which is secured in any desired manner to the bars 11 of the hangers 9. I have shown eyes 20 on the hangers for this purpose. The other ends of these springs are secured to the under part of the frame or body of the vehicle in any suitable manner, but preferably by eyes 21. These springs 19 normally hold the hangers swung on their pivot pins 8 clear of the pavement or ground, as shown by dotted lines in Fig. 1.

22 indicates a transverse shaft journaled in suitable bearings 33 at either side of the frame of the vehicle and in line or nearly so with the front seat of the machine. This shaft 22 has two downward projecting crank arms 23, one in line with each of the hangers 9. These arms 23 are bifurcated at their lower ends and between the prongs are pivoted one end of the two connecting rods 24 by pivot pins 25. These connecting rods 24 are bifurcated at their other ends to allow them to straddle the bars 10 of the hangers 9 and at the ends of the prongs are provided with holes for the reception of bolts or pins 26 which form axles for the rollers 27. These rollers 27 are preferably tapered from each end toward the center and bear upon the inner surface of the bar 10, which is preferably rounded to fit the tapered form of the rollers, as shown more clearly in Fig. 7 to prevent edge binding. In order that the length of the connecting rods may be adjustable, I prefer to make them in sections and screw-threaded on one end and to employ turnbuckles 28 as shown in Fig. 1, although they may be made in one piece and the turnbuckles dispensed with if desired as shown in Fig. 10.

One end of the transverse shaft 22 is squared to receive the hand lever 29 through a square hole in which it extends and may be screw-threaded on the end projecting beyond the lever to receive a nut 30 which prevents the lever working off the shaft. The lever may be locked in position by a pivoted dog 31 which engages the notches in the fixed sector 32.

As before remarked, the shoes 12 will normally be elevated clear of the ground by means of the spiral springs 19 as shown by dotted lines in Fig. 1, but when the machine shows a tendency of skidding or when there is danger of it from the condition of the road or pavement, the driver grasps the hand lever 29, at the same time releasing the dog 31 from the teeth of the sector 32 and by tilting the lever toward himself, the shaft 22 will be turned throwing the lower ends of the dependent arms 23 forward and thereby through the means of the connecting rods 24 and the rollers 27 at their ends bearing and riding upon the inner surface of the bars 10 of the hangers 9 will draw down the hangers 9 bringing their shoes 12 into contact with the road or pavement when the heads of the bolts 17 will grip the road or pavement and effectually check the skidding. The hangers 9 may move laterally upon the bolts 8 against the helical springs at either side thereof when the tension on the springs is overcome by the shoes 12 meeting with an obstruction or inequalities of the road or pavement and these springs prevent sudden shock or undue strain upon the hangers under such conditions.

It will be readily understood that the heads of the bolts 17 on the under surface of the shoes 12 provide effective grips and prevent wear upon the shoes proper, and that where one or more of the bolt heads become worn out they may be easily replaced by others without changing the shoes.

To operate the jacks 13, the hangers 9 are brought down with the shoes 12 in contact with the road or pavement, when by rolling the vehicle backward the bars 11 will assume a vertical position with the jacks seated upon the road or pavement, which movement will elevate the rear of the vehicle.

When the purpose for which the vehicle is jacked up is accomplished, the vehicle is moved forward again, bringing the hangers and jacks to a normal position.

I claim as my invention:

1. A device of the character described, having a part of its external surface containing gripping members to be used as a drag brake, and a triangular portion having a smooth external surface to act as a base for holding a vehicle supported above the ground when desired.

2. A combined brake-shoe and jack formed with a socket at one end and two straight bars extending therefrom in spread apart relation to each other, a curved bar extending between the spread apart ends of the straight bars, the external surface of said curved bar containing gripping members to act as a drag brake, and a triangular portion on one of said straight bars at its lower part, having a smooth external surface and adapted to act as a base for holding a vehicle supported above the ground when desired.

3. In combination with an automobile, an antiskidding device comprising two hangers provided with shoes at their lower ends, clamps secured to the rear axle sleeve of the machine and to which the hangers are pivotally connected, means for normally carrying the hangers elevated from the roadway, a revoluble shaft journaled in bearings on the machine forward of the rear axle, and having two downward projecting arms, one in line with each hanger, rods pivotally connected at one end to the lower ends of said arms and bifurcated at their other ends straddling the forward bars of said hangers, rollers pivoted between the prongs of said rods to the rear of said front bars of the hangers and riding thereon and a hand lever secured to one end of said shaft, whereby the tilting of said lever in a backward direction will draw the shoes on said hangers into contact with the roadway.

4. In combination with an automobile, an antiskidding device comprising two hangers provided with shoes and jacks at their lower ends, clamps secured to the rear axle sleeve of the vehicle and to which the hangers are pivotally connected, springs, one end of each of which is connected to the rear bars of the hangers and their other ends connected to the bottom of the vehicle, whereby the hangers are normally carried elevated from the roadway, a revoluble shaft journaled in bearings on the vehicle forward of the rear axle and having two downwardly projecting arms, one in line with each hanger, rods pivotally connected at one end to the lower ends of said arms and bifurcated at their other ends straddling the front bars of said hangers, rollers pivoted between the prongs of said rods to the rear of said front bars of the hangers and riding thereon, and a hand lever secured to one end of said shaft, whereby the tilting of said lever in a backward direction will draw the shoes on said hangers into contact with the roadway.

5. In combination with an automobile, an antiskidding device comprising two hangers provided with shoes at their lower ends, said shoes being provided with a plurality of removable grippers, clamps secured to the rear axle sleeve of the vehicle and to which the hangers are pivotally connected, springs, one end of each of which is connected to the rear bars of the hangers and their other ends connected to the bottom of the vehicle whereby the hangers are normally carried elevated from the roadway, a revoluble shaft journaled in bearings on the vehicle forward of the rear axle and having two downwardly projecting arms, one in line with each hanger, rods pivotally connected at one end to the lower ends of said arms and bifurcated at their other ends to straddle the front bars of said hangers, rollers pivoted between the prongs of said rods to the rear of said front bars of the hangers and riding thereon, a hand lever secured to one end of said shaft, whereby the tilting of said lever in a backward direction will draw the shoes on said hangers into contact with the roadway, and means for locking said lever in position.

6. In combination with an automobile, an antiskidding device comprising two hangers provided with shoes at their lower ends, clamps secured to the rear axle sleeve of the vehicle and to which the hangers are pivotally connected, helical springs at either side of said hangers at their pivotal connections, springs, one end of each of which is connected to the hangers and their other ends connected to the bottom of the vehicle whereby the hangers are normally carried elevated from the roadway, a revoluble shaft journaled in bearings on the vehicle forward of the rear axle and having two downwardly projecting arms, one in line with each hanger, rods pivotally connected at one end to the lower ends of said arms and bifurcated at their other ends to straddle the front bars of said hangers, rollers pivoted between the prongs of said rods to the rear of said front bars of the hangers and riding thereon, and a hand lever secured to one end of said shaft, whereby the tilting of said lever in a backward direction will draw the shoes on said hangers into contact with the roadway.

7. In combination with an automobile, an antiskidding device comprising two hangers provided with shoes at their lower ends, clamps secured to the rear axle sleeve of the vehicle and to which the hangers are pivotally connected, helical springs at either side of said hangers at their pivotal connections, springs, one end of each of which is connected to the hangers and their other ends connected to the bottom of the vehicle whereby the hangers are normally carried elevated from the roadway, a revoluble shaft journaled in bearings on the vehicle forward of the rear axle and having two downwardly projecting arms one in line with each hanger, sectional connecting rods between said arms and said hangers, turnbuckles connecting the sections of said rods and a hand lever secured to one end of said shaft, whereby the tilting of said lever in a backward direction will draw the shoes on said hangers into contact with the roadway.

Signed by me this 2d day of May 1911.

FLORENCE FRANK HEFFERNAN.

Witnesses:
GEO. T. PINCKNEY,
E. ZACHARIASEN.